US008517755B2

(12) United States Patent
Hirashita (10) Patent No.: US 8,517,755 B2
(45) Date of Patent: Aug. 27, 2013

(54) POWER PLUG LOCKING DEVICE (75) Inventor: Takahiro Hirashita, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 13/424,775

(22) Filed: Mar. 20, 2012

(65) Prior Publication Data
US 2012/0252251 A1 Oct. 4, 2012

(30) Foreign Application Priority Data
Mar. 29, 2011 (JP) .................................. 2011-073129

(51) Int. Cl.
*H01R 13/62* (2006.01)
(52) U.S. Cl.
USPC ........................................................ 439/304
(58) Field of Classification Search
USPC ........................ 439/304, 310, 372, 345, 352
See application file for complete search history.

(56) References Cited

U.S. PATENT DOCUMENTS

| 8,016,604 | B2 * | 9/2011 | Matsumoto et al. | 439/304 |
| 2011/0034053 | A1 * | 2/2011 | Matsumoto et al. | 439/304 |
| 2011/0300733 | A1 * | 12/2011 | Janarthanam et al. | 439/304 |
| 2013/0045616 | A1 * | 2/2013 | Adams | 439/304 |

FOREIGN PATENT DOCUMENTS
JP 09-161898 6/1997

OTHER PUBLICATIONS
U.S. Appl. No. 13/418,988 to Takahiro Hirashita et al., filed Mar. 13, 2012.

* cited by examiner

*Primary Examiner* — Jean F Duverne
(74) *Attorney, Agent, or Firm* — Greenblum & Bernstein P.L.C.

(57) ABSTRACT

A power plug locking device prevents unauthorized removal of a power plug from an inlet. An operation button is arranged on a case of the power plug locking device to switch the power plug locking device to a lock state. The operation button is coupled by a link to a lock bar of a lock mechanism. When the operation button is pushed, the pushing force is transmitted by the link to the lock bar. This pivots the lock bar in a lock direction. When the lock bar is located at a lock position, a pin of a plug lock is hooked to the lock bar to maintain the lock bar in a lock state.

8 Claims, 7 Drawing Sheets

POWER PLUG LOCKING DEVICE

CROSS-REFERENCE TO RELATED APPLICATIONS

This application is based upon and claims the benefit of priority from prior Japanese Patent Application No. 2011-073129, filed on Mar. 29, 2011, the entire contents of which are incorporated herein by reference.

BACKGROUND OF THE INVENTION

The present invention relates to a power plug locking device that locks a power plug to an object, such as a vehicle, and prevents unauthorized removal of the power plug from the object.

In recent years, consumers have become conscious of environmental problems. Thus, vehicles that emit less carbon dioxide such as hybrid vehicles and electric vehicles have become popular. Such vehicles are driven by a battery-powered motor. When such a vehicle travels over a long distance and the state of charge of the battery becomes low, the battery must be charged (refer to Japanese Laid-Open Patent Publication No. 9-161898).

The charging of a battery involves an electrolytic reaction of compounds and ions in battery cells of the battery. This lengthens the charging time. Thus, when a user leaves the vehicle while the battery is being charged, someone may remove the power plug to steal electricity. Hence, locking devices have been developed to prevent unauthorized removal of the power plug from a vehicle.

The location in a vehicle at which a power plug locking device is installed, such as in the side wall of the vehicle body, may have limited space. Thus, it is required that a power plug locking device be developed for vehicles having limited space in the vehicle body. Further, when space is limited, a smaller power plug locking device would be advantageous. Accordingly, there is a demand for a compact power plug locking device.

SUMMARY OF THE INVENTION

One aspect of the present invention is a power plug locking device that prevents unauthorized removal of a power plug from an inlet. The power plug locking device includes a lock member arranged in the inlet. The lock member is engageable with the power plug when the power plug is connected to the inlet. An operation unit moves the lock member to at least one of a lock position and an unlock position. A link mechanism couples the operation unit and the lock member. A lock mechanism transmits an operation force of the operation unit with the link mechanism to the lock member when the operation unit is operated to move the lock member to the lock position or the unlock position. A position holding unit holds the lock member at the lock position or the unlock position. A device body accommodates the lock mechanism. A drive unit drives the position holding unit to release the lock member from the position holding unit. The drive unit is discrete from the device body.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

One embodiment of a power plug locking device according to the present invention will now be described with reference to FIGS. 1 to 11.

Figure 1:
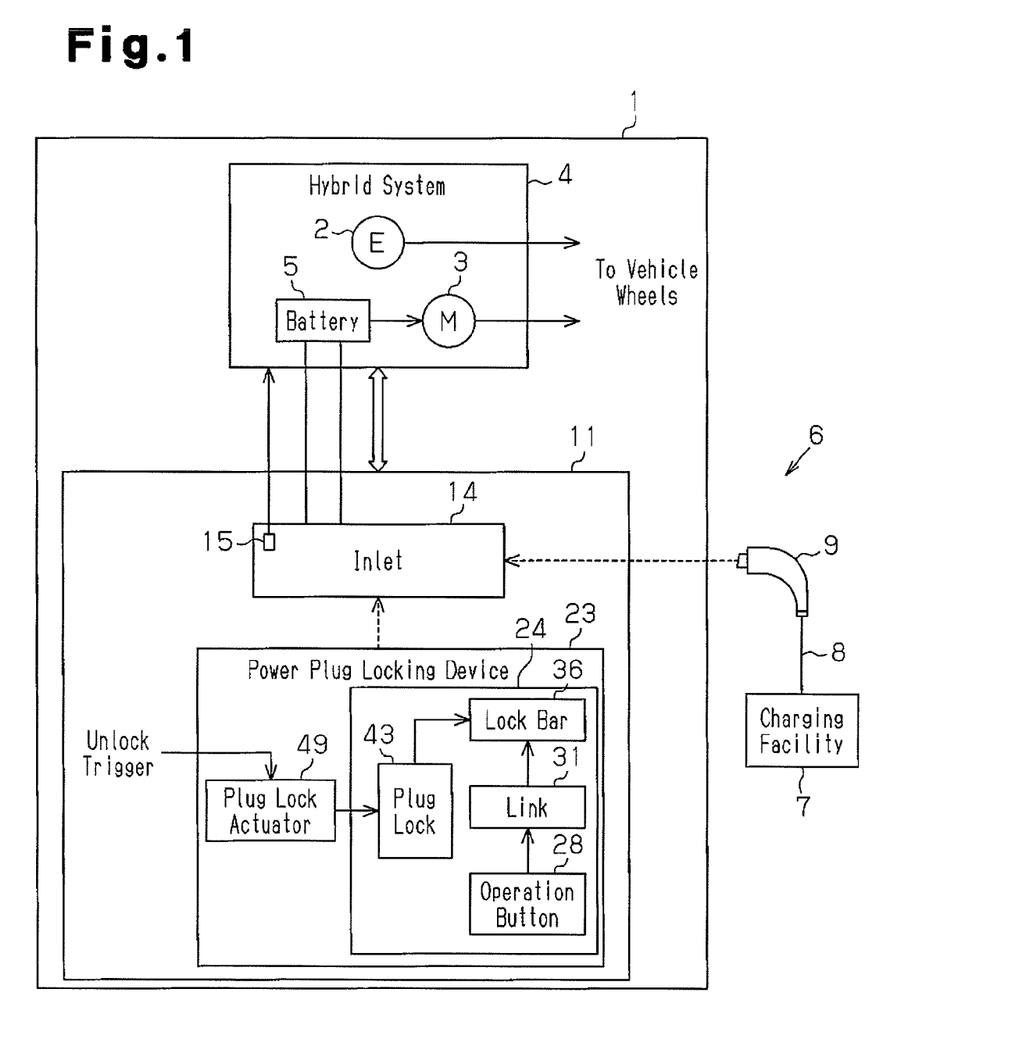
FIG. 1 is a block diagram of a vehicle and a charge system in one embodiment of the present invention.

Referring to FIG. 1, a hybrid vehicle 1 includes an engine 2 and a motor 3 arranged in a vehicle body 10. The engine 2 and the motor 3 form a hybrid system 4 and generate power to rotate vehicle wheels. The hybrid system 4 includes a battery 5, which serves as a power source for the motor 3. The vehicle 1 also includes a charge system 6 that charges the battery 5 with an external power supply. The charge system 6 uses a charging facility 7, such as a charging station or a residential power outlet. The charging facility 7 provides a charge cable 8 and a power plug 9, which is arranged on a distal end of the charge cable 8. The power plug 9 is connected to the vehicle 1 to charge the battery 5.

Figure 2:
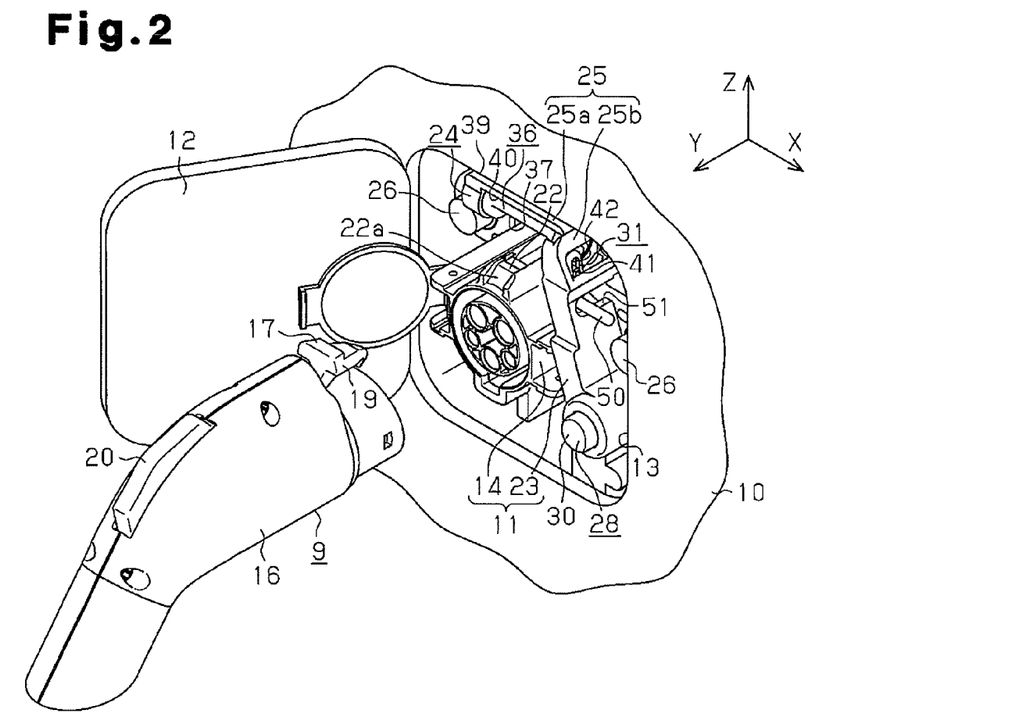
FIG. 2 is a perspective view showing a power plug and an inlet.

Referring to FIGS. 1 and 2, the vehicle body 10 includes a lid 12, which opens and closes an accommodation compartment 13. A power reception connector 11, which is arranged in a side wall of the vehicle body 10, is accommodated in the accommodation compartment 13. The power plug 9 is connected to the power reception connector 11. The power reception connector 11 includes an inlet 14 including electric connection terminals (e.g., power terminal and control terminals). A plug connection detector 15 is arranged in the inlet 14 to detect whether the power plug 9 has been completely fitted to the inlet 14.

Figure 3:
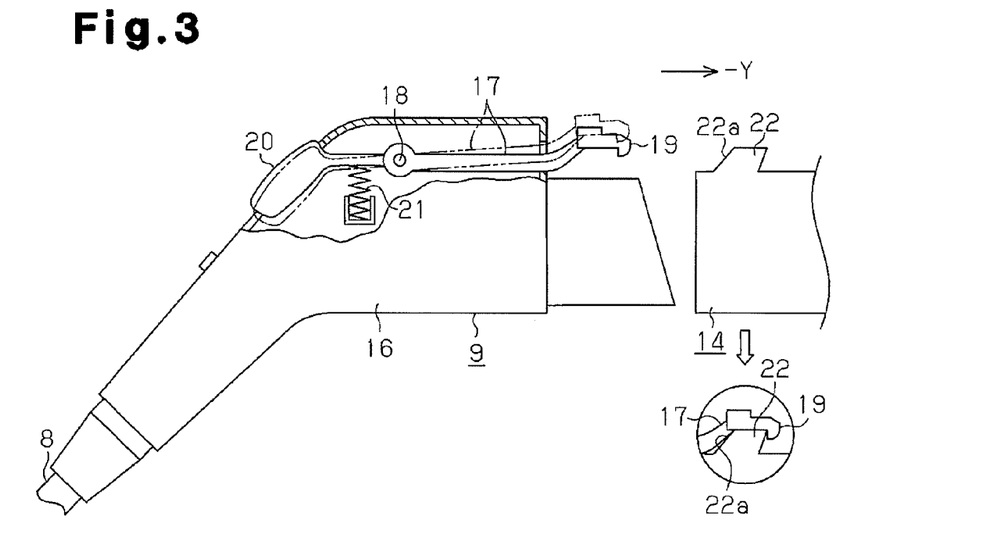
FIG. 3 is a side view showing the power plug and the inlet.

Referring to FIGS. 2 and 3, the power plug 9 is arranged in the power supply side of the charge system 6 and includes electric connection terminals connected to the electric connection terminals of the inlet 14. The power plug 9 includes a plug body 16 and a lock arm 17. The lock arm 17 is pivotally coupled to the plug body 16 to prevent separation of the power plug 9 from the inlet 14. A pivot shaft 18 pivotally supports a longitudinally middle part the lock arm 17. The lock arm 17 includes a distal portion defining a hook 19 and a basal portion defining a lever 20. The hook 19 and lever 20 are exposed from the plug body 16. An urging member 21 is arranged near the lever 20 to constantly urge and force the lock arm 17 in a closing direction.

To connect the power plug 9 to the power reception connector 11, the power plug 9 is fitted straight in an insertion direction (−Y axis direction of FIG. 3) into the power reception connector 11. This guides and raises the hook 19 along a sloped surface 22a of a projection 22 on the inlet 14. When the plug 9 is completely fitted to the inlet 14, the urging force of the urging member 21 pivots the lock arm 17 and hooks the hook 19 to the projection 22. This prevents separation of the power plug 9 from the inlet 14.

When determining that the power plug 9 has been completely fitted to the inlet 14, the hybrid system 4 charges the battery 5 with the power plug 9 (charging facility 7). When determining that the battery 5 has been fully charged, the hybrid system 4 ends the charging with the power plug 9. To remove the power plug 9 from the inlet 14 after charging ends, the lever 20 is pushed to pivot the lock arm 17 in an opening direction and move the hook 19 away from the projection 22. In this state, the power plug 9 is pulled straight out of the inlet 14 and removed from the vehicle 1.

Figure 4:
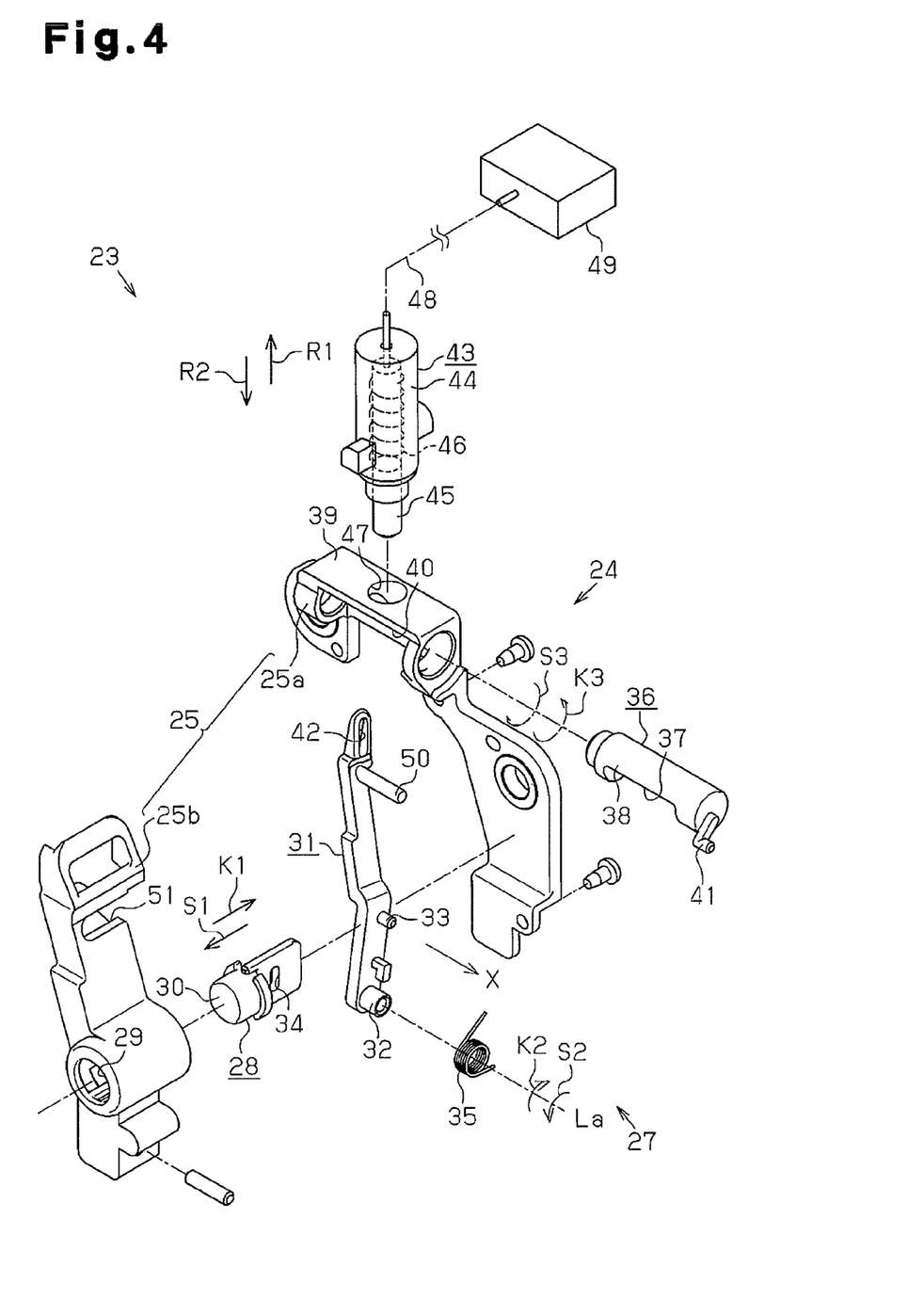
FIG. 4 is an exploded perspective view showing the power plug locking device.
Figure 5:
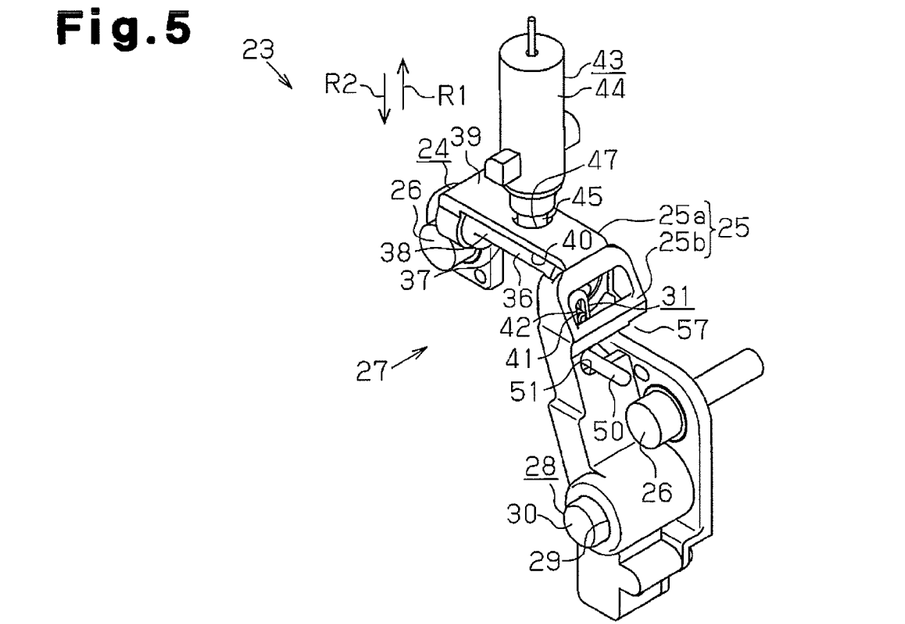
FIG. 5 is a perspective view showing the power plug locking device.
Figure 6:
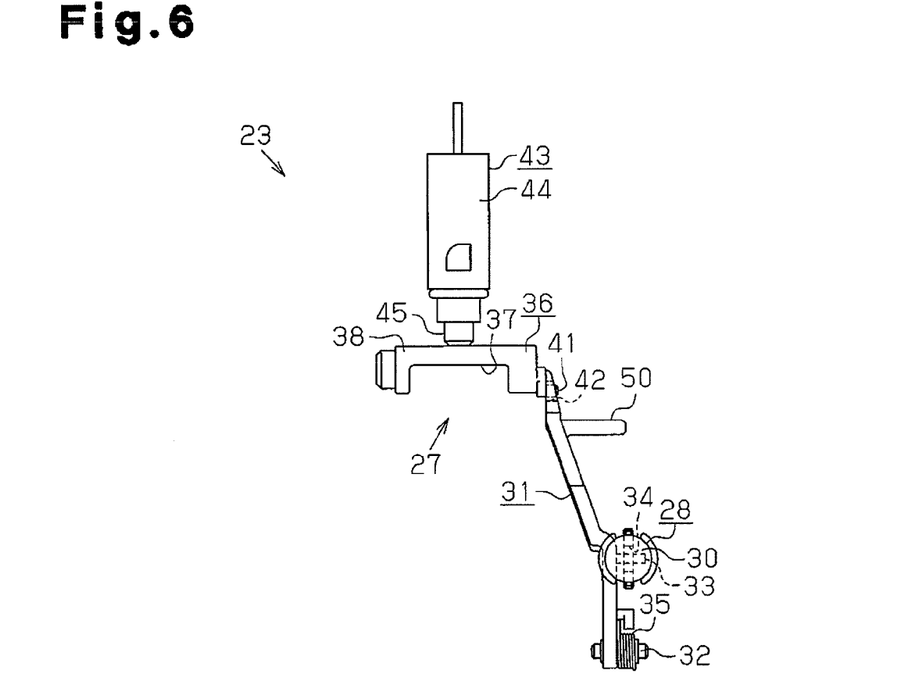
FIG. 6 is a front view showing the power plug locking device.

Referring to FIGS. 4 to 6, the power reception connector 11 includes a power plug locking device 23, which prevents unauthorized removal of the power plug 9 from the inlet 14. The power plug locking device 23 is manually operated to switch from an unlock state to a lock state. A mechanical structure holds the power plug locking device 23 in the lock state. When the power plug locking device 23 is in the lock state, the power plug locking device 23 electrically performs an unlock operation when an unlocking operation of a vehicle door is performed.

The accommodation compartment 13 of the inlet 14 accommodates a device body 24 of the power plug locking device 23. The device body 24 includes a case 25, which accommodates various components. The case 25 has a reversed L shape to avoid interference with the inlet. Further, the case 25 is formed by a first case 25a, which forms a main part, and a second case 25b, which is coupled to the front of the first case 25a. Fastening pins 26 securely fix the first case 25, and consequently the power plug locking device 23, to the inlet 14.

A lock mechanism 27 of the power plug locking device 23 is arranged in the case 25. An operation button 28, which is linearly movable in a Y axis direction of FIG. 4, is coupled to the second case 25b. The operation button 28 is operated when switching the power plug locking device 23 to a lock state. Further, the second case 25b includes a button receptacle 29 that receives the operation button 28. The operation button 28 includes a cylindrical distal portion that defines a knob 30. The knob 30 is exposed when the operation button 28 is accommodated in the button receptacle 29. The operation button 28 forms an operation unit and a lock operation unit.

A link 31 is coupled to the second case 25b. The link 31 is pivotal about an axis La of a link pivot shaft 32. The link 31 is a plate that is mechanically coupled to the operation button 28. A coupling projection 33, which projects from the middle of the link 31 in the X axis direction of FIG. 4, is engaged with an elongated hole 34 of the operation button 28. When the operation button 28 is pushed in an inward direction (the direction of arrow K1 in FIG. 4), the link 31 pivots in a lock direction (the direction of arrow K2 in FIG. 4). When the operation button 28 moves in an outward direction (the direction of arrow S1 in FIG. 4), the link 31 pivots in an unlock direction (the direction of arrow S2 in FIG. 4). The link 31 and the elongated hole 34 form a link mechanism.

An automatic return urging member 35, which automatically pivots the link 31 in the unlock direction, is coupled to the link pivot shaft 32. The automatic return urging member 35, which may be a torsion spring, includes one end fixed to the first case 25a and another end fixed to the link 31. The automatic return urging member 35 corresponds to an automatic returning unit.

A lock bar 36, which is pivotal about its axis Lb, is coupled to a distal end of the link 31. The lock bar 36 is cylindrical and restricts movement of the lock arm 17 in the opening direction. The lock bar 36 is partially cut out to form a hollow portion 37 having a triangular cross-section. The remaining part of the lock bar 36 defines a solid portion 38. When the lock bar 36 is pivoted so that the hollow portion 37 faces the lock arm 17, the lock bar 36 is in an unlock state. When the lock bar 36 is pivoted so that the solid portion 38 faces the lock arm 17, the lock bar 36 is in a lock state. The lock bar 36 corresponds to a lock member.

An upper part of the first case 25a defines a lock bar coupling portion 39, which includes an accommodation compartment 40. The lock bar 36 is movably accommodated in the accommodation compartment 40 of the lock bar coupling portion 39. A coupling projection 41 is engaged with an elongated hole 42 extending through the upper part of the link 31. When the link 31 pivots in the direction of arrow K2, the lock bar 36 pivots in a lock direction (the direction of arrow K3 in FIG. 4). When the link 31 pivots in the direction of arrow S2, the lock bar 36 pivots in an unlock direction (the direction of arrow S3 in FIG. 4). The coupling projection 41 forms a link mechanism.

A plug lock 43, which holds the lock bar 36 in the lock state, is coupled to the upper part of the first case 25a. The plug lock 43 includes a cylindrical barrel 44. The barrel 44 accommodates a cylindrical pin 45, which is movable back and fourth in the axial direction of the barrel 44. The pin 45 is inseparable from the barrel 44. A pin projection urging member 46, which constantly urges the pin 45 in a projection direction, is arranged on the pin 45. The pin projection urging member 46, which may be a coil spring, includes one end fixed to the pin 45 and another end fixed to the barrel 44. An insertion hole 47 extends through an upper wall of the lock bar coupling portion 39. The plug lock 43 is inserted into the insertion hole 47 of the lock bar coupling portion 39. The pin 45 projects toward the lock bar 36. The plug lock 43 corresponds to a position holding unit, and the pin 45 corresponds to an engagement member.

The pin 45 of the plug lock 43 is connected by a wire 48 to a plug lock actuator 49. The plug lock actuator 49 may be a solenoid or a motor. The plug lock actuator 49 is separated from the case 25 and located outside the device body 24. In this manner, the power plug locking device 23 is of an actuator-separated type in which the plug lock actuator 49 is eliminated from the device body 24. When the plug lock actuator 49 is not supplied with power, the pin 45 is permitted to freely move upward and downward in the lock direction and unlock direction. The plug lock actuator 49 corresponds to a drive unit.

When the plug lock actuator 49 is supplied with power, the plug lock actuator 49 pulls the pin 45 with the wire 48 and moves the pin 45 in a retraction direction (the direction of arrow R1 in FIG. 4) against the urging force of the urging member 46. Further, when the supply of power to the plug lock actuator 49 is stopped, the urging force of the urging member 46 moves the pin 45 straight in the projection direction (the direction of arrow R2 in FIG. 4) and returns to its original position.

The link 31 includes a manual pivoting portion 50, which is operated when manually pivoting the link 31. For example, when the link 31 is frozen and cannot pivot on its own, a user manually operates the manual pivoting portion 50 to forcibly pivot the link 31. The manual pivoting portion 50 forms a lever near the distal end of the link 31. The second case 25b has a side wall including a slot 51. The manual pivoting portion 50 is exposed from the second case 25b through the slot 51. The manual pivoting portion 50 corresponds to a manual operation unit.

The operation of the power plug locking device 23 will now be described with FIGS. 7 to 10.

Figure 7:
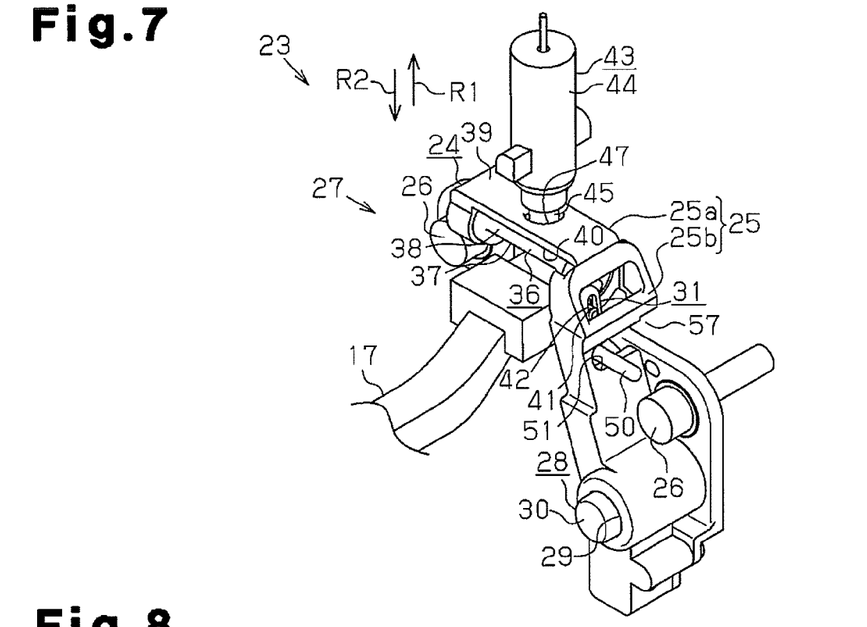
FIG. 7 is a perspective view showing the power plug locking device in an unlock state.
Figure 8:
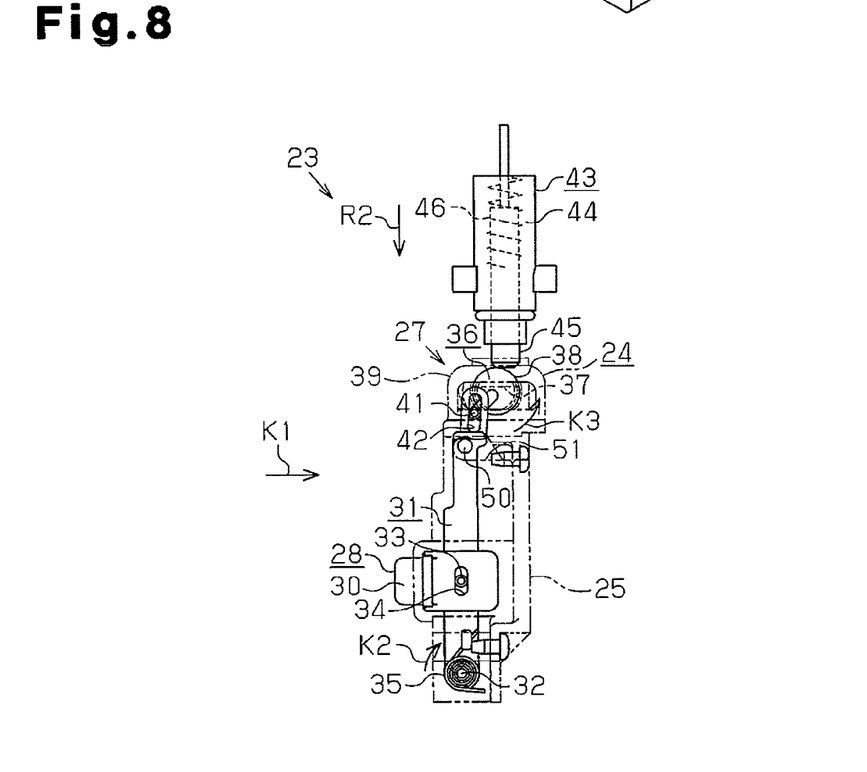
FIG. 8 is a side view showing the power plug locking device in the unlock state.

FIGS. 7 and 8 show the power plug locking device 23 in an unlock state. Here, the urging force of the automatic return urging member 35 pivots the link 31 so that the knob 30 is greatly projected outward and located at a projection position (initial position). The lock bar 36 is located at a pivotal position (unlock position) at which the hollow portion 37 faces the projection 22. In this state, the hollow portion 37 is effective. That is, the power plug locking device 23 is in an unlock state. Thus, the lock arm 17 can be pivoted, and the power plug 9 can be freely connected or removed from the inlet 14.

In the unlock state, the plug lock actuator 49 is not supplied with power. Thus, the pin 45 of the plug lock 43 is freely movable upward and downward. In this state, the pin 45 of the plug lock 43 is pushed by the solid portion 38 of the lock bar 36. Thus, the pin 45 is retracted into the barrel 44 against the urging force of the urging member 46. In other words, the plug lock 43 is ineffective, and pivoting of the lock bar 36 is permitted.

To shift the power plug locking device 23 from the unlock state to a lock state after the power plug 9 is connected to the inlet 14, the operation button 28, which is located at the projection position, is pushed against the urging force of the automatic return urging member 35. This moves the operation button 28 straight in an inward direction (the direction of arrow K1 in FIG. 8) and pivots the link 31 in the lock direction (the direction of arrow K2 in FIG. 8) about the link pivot shaft 32.

As the link 31 moves in the direction of arrow K2, the lock bar 36 pivots in a lock direction (the direction of arrow K3 in FIG. 8). The operation button 28 can be pushed until the link 31 comes into contact with an inner wall surface of the first case 25a.

Figure 9:
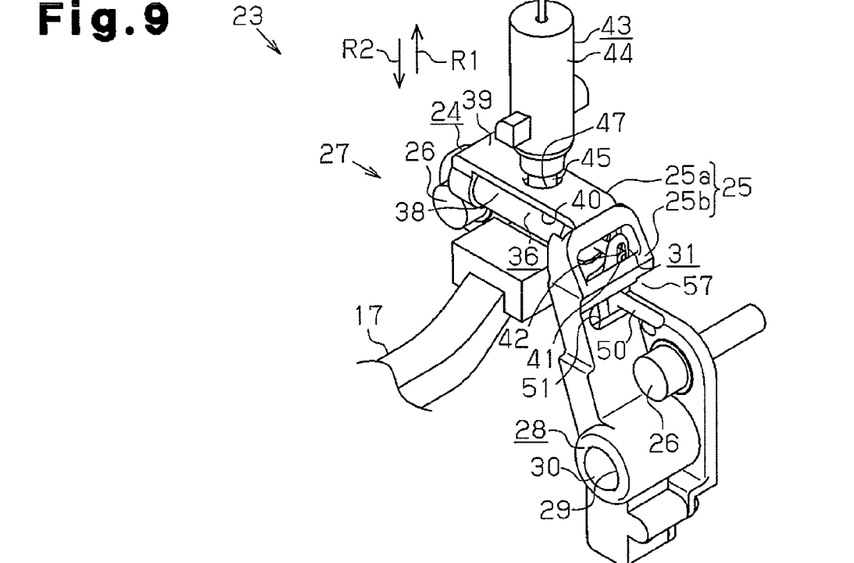
FIG. 9 is a perspective view showing the power plug locking device in a lock state.
Figure 10:
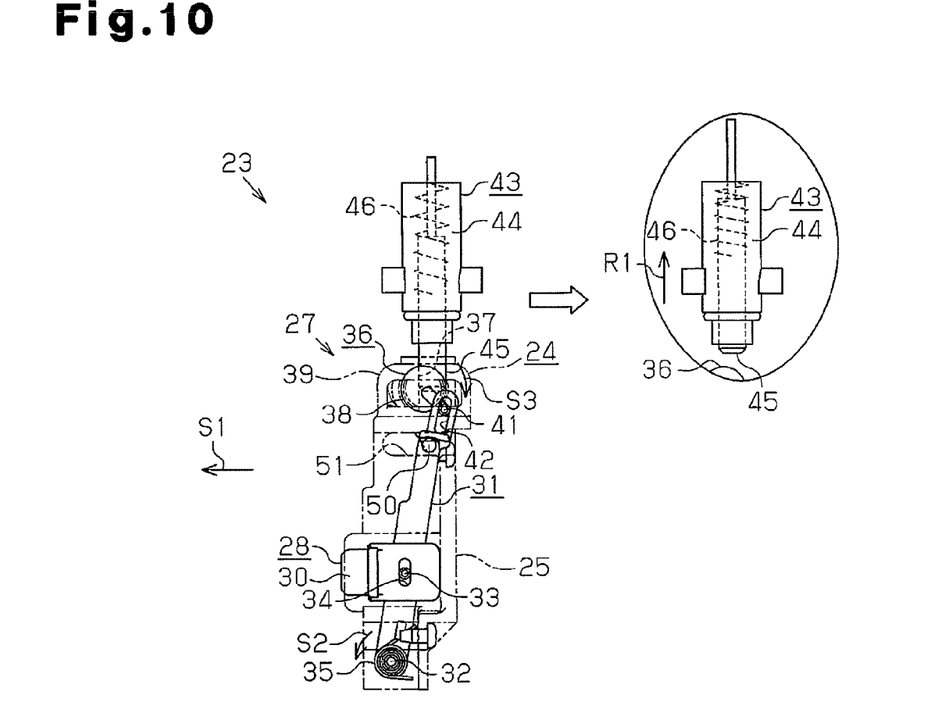
FIG. 10 is a side view showing the power plug locking device in the lock state.

Referring to FIGS. 9 and 10, when the link 31 comes into contact with the inner wall surface of the first case 25a, the lock bar 36 is pivoted inward by approximately 45 degrees. In this state, the lock bar 36 is located at a pivotal position (lock position) at which the solid portion 38 faces the projection 22, and the solid portion 38 is effective. This restricts the movement of the lock arm 17, which is hooked to the projection 22 of the inlet 14, in the opening direction. Thus, the power plug locking device 23 is in a lock state.

Here, the hollow portion 37 of the lock bar 36 faces the plug lock 43. Thus, the pin 45 is released from the solid portion 38 and moved straight in the projection direction (the direction of arrow R2 in FIG. 10) by the urging force of the urging member 46. This hooks the pin 45 to the hollow portion 37, and the plug lock 43 restricts pivoting of the lock bar 36. As a result, the pivoting of the lock bar 36 is prohibited, and the power plug locking device 23 is maintained in a lock state.

Then, when an unlocking operation of the vehicle door is performed during the lock state of the power plug locking device 23, the power plug locking device 23 also performs an unlocking operation when the door unlocking operation is performed. In this state, when the plug lock actuator 49 receives an unlock trigger, the plug lock actuator 49 performs an unlock operation. The unlock trigger may be some of the current (voltage) flowing through a door lock motor or a command output from a control integrated circuit (IC) to start an unlock operation.

When the plug lock actuator 49 performs an unlock operation, the plug lock actuator 49 pulls the pin 45 of the plug lock 43 with the wire 48 in the retraction direction (the direction of arrow R1 in FIG. 10). This separates the pin 45 from the hollow portion 37 of the lock bar 36 and shifts the plug lock 43 from a lock state to an unlock state. Thus, the lock bar 36 is released from the plug lock 43 and becomes movable in the unlock direction.

In this state, the urging force of the automatic return urging member 35 integrally moves the operation button 28, the link 31, and the lock bar 36 in the unlock direction. More specifically, the lock bar 36 pivots in the direction of arrow S3 in FIG. 10, the link 31 pivots in the direction of arrow S2 in FIG. 10, and the operation button 28 moves straight in the direction of arrow S1 in FIG. 10. The link 31 is pivotal in the unlock direction until coming into contact with the inner wall surface of the second case 25b.

Referring to FIGS. 7 and 8, when the link 31 comes into contact with the inner wall surface of the second case 25b, the lock bar 36 is pivoted by approximately 45 degrees. In this state, the lock bar 36 is located at a pivotal position (unlock position) at which the hollow portion 37 faces the projection 22, and the hollow portion 37 is effective. In other words, when the lock bar 36 is located at the unlock position, the lock bar 36 provides space allowing for the lock arm 17 to move away from the projection 22. This returns the power plug locking device 23 to an unlock state in which the lock arm 17, which is hooked to the projection 22 of the inlet 14, is permitted to move in an opening direction.

As described above, the link 31 couples the operation button 28 and the lock bar 36, and the power plug locking device 23 is manually switched to a lock state by pushing the operation button 28. When the operation button 28 is pushed, the link 31 transmits the operation force to the lock bar 36. This moves the lock bar 36 in the lock direction and shifts the power plug locking device 23 to a lock state.

Figure 11:
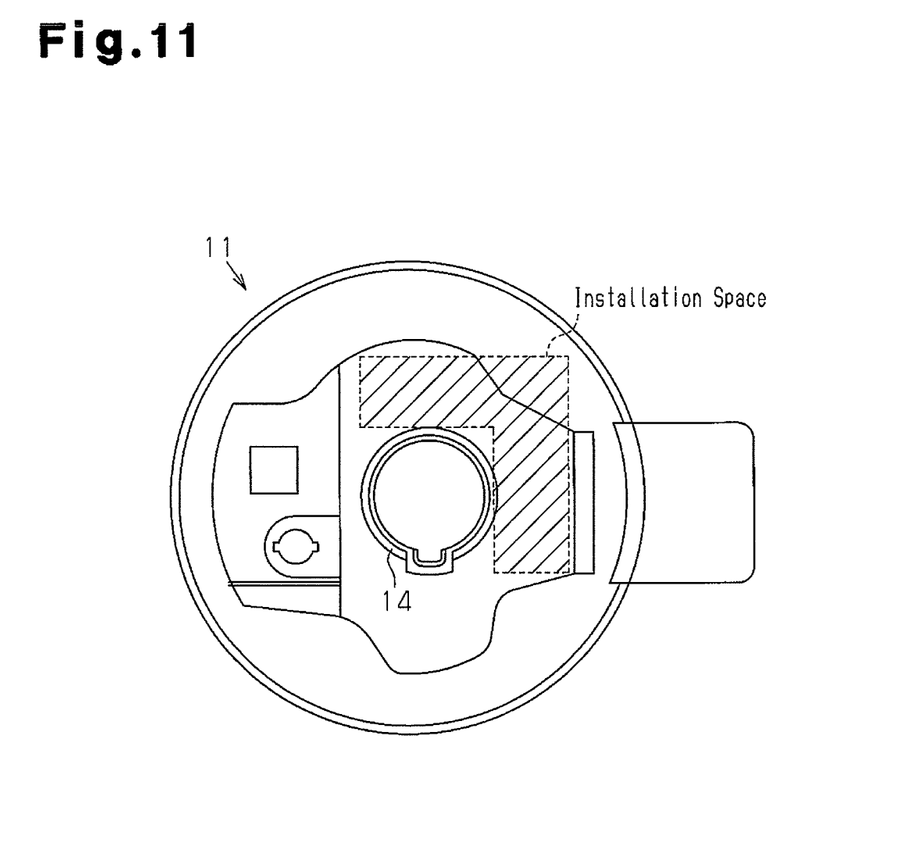
FIG. 11 is a side view showing an inlet.

Referring to FIG. 11, space for the locking of the lid 12 is required around the inlet 14. Thus, available space (portion indicated by hatching lines) for the power plug locking device 23 is limited in the proximity of the inlet 14. In the present example, the link 31 couples the operation button 28 and the lock bar 36. Thus, in the power plug locking device 23, the operation button 28 and the lock bar 36 may be separated from each other. In this manner, even when the available space for the power plug locking device 23 is limited, the power plug locking device 23 can be arranged in vacant space.

Further, the plug lock actuator 49, which serves as a drive source when switching the power plug locking device 23 to an unlock state, is discrete from the power plug locking device 23. Thus, the device body 24 of the power plug locking device 23 may be reduced in size since the plug lock actuator 49 is not included. In this manner, even when the available space for the power plug locking device 23 is limited, the power plug locking device 23 may be effectively installed in the available space.

The above embodiment has the advantages described below.

(1) The operation button 28 and the lock bar 36 are coupled by the link 31. Further, the plug lock actuator 49, which serves as a drive source when releasing the power plug locking device 23 from the lock state, is discrete from the device body 24 of the power plug locking device 23. Thus, even when the available space for the power plug locking device 23 is limited, the power plug locking device 23 may be effectively installed in the available space.

(2) The power plug locking device 23 is manually switched to the lock state. Thus, the power plug locking device 23 is switched to the lock sate only when truly necessary. If the locking operation of the power plug locking device 23 were to be performed when a door locking operation is performed, a locking operation would be performed whenever the vehicle door is locked. This would shorten the duration of the power plug locking device 23. However, in the present example, the power plug locking device 23 does not perform unnecessary locking operations. This lengthens the duration of the power plug locking device 23.

(3) The lock bar 36 is pivotal about its axis Lb at the same position. Thus, there is no need to provide space for movement of the lock bar 36 between a lock position and an unlock position. This contributes to the miniaturization of the power plug locking device 23.

(4) The pin 45 of the plug lock 43 is directly engaged with the lock bar 36 to hold the lock bar 36 at the lock position. Thus, when the power plug locking device 23 is in a lock state, even if someone destroys the link 31, the plug lock 43 would maintain the lock bar 36 in a lock state. This enhances the unauthorized unlocking prevention effect of the power plug locking device 23.

(5) The automatic return urging member 35 is arranged on the link pivot shaft 32 of the link 31 to automatically return the operation button 28, the link 31, and the lock bar 36 to an initial state (unlock state) prior to the pushing of the operation button 28. Thus, to return the power plug locking device 23 to an unlock state, the user does not have to perform a separate operation. This improves convenience.

(6) The unlocking operation of the power plug locking device 23 is performed when the vehicle door is unlocked. When the vehicle door is unlocked, the power plug locking device 23 is automatically switched to an unlock state. When switching the power plug locking device 23 to an unlock state, the user does not have to perform a separate operation. This improves convenience.

(7) The link 31 includes the manual pivoting portion 50. Thus, when the link 31, for example, freezes and cannot be moved, the manual pivoting portion 50 can be operated to forcibly turn the link 31. This avoids a situation in which the power plug locking device 23 cannot be actuated.

(8) The lock bar 36 and the plug lock 43 are engaged with each other at a location that is concealed in the device body 24. This prevents someone from destroying this location. Thus, unauthorized unlocking becomes difficult.

It should be apparent to those skilled in the art that the present invention may be embodied in many other specific forms without departing from the spirit or scope of the invention. Particularly, it should be understood that the present invention may be embodied in the following forms.

The conditions for starting the charging of the battery 5 can be changed. For example, charging may be started when the plug connection detector 15 detects that the power plug 9 has been fitted to the inlet 14 and that ID verification of an electronic key for the vehicle 1 has been satisfied.

A switch for stopping the charging of the battery 5 may be arranged in the vehicle 1.

The structure of the lock mechanism 27 is not limited to the foregoing description and may be changed as required.

The power plug locking device 23 may be automatically locked and manually unlocked.

The operation unit is not limited to a push type and may be a rotation type that rotates a lever or a type that slides a knob in a lateral direction.

The automatic returning unit is not limited to a spring and may use, for example, a motor.

The manual operation unit is not limited to the manual pivoting portion 50, which is lever-shaped. For example, the manual operation unit may directly pull the link 31 with a wire or the like.

The lock bar 36 does not have to be cylindrical. For example, the lock bar 36 may be box-shaped.

The lock bar 36 does not have to be pivotal about its axis Lb at the same position. For example, the lock bar 36 may move straight or be a triangular plate pivoted about its base.

The lock member is not limited to the lock bar 36 that is shifted to a lock state when located above the lock arm 17 and may be formed by a plurality of components. For example, the lock bar may restrict the pivoting of the lock arm 17 with a predetermined member (e.g., a pivotal boot-shaped locking lever).

The power plug locking device 23 may be shifted to a lock state when the lock bar 36 is inserted into a recess of the power plug 9.

The position holding unit does not have to use the plug lock 43. For example, the position holding unit may have a dead lock structure.

The position holding unit does not have to use the hollow portion 37 of the lock bar 36 to stop pivoting of the lock bar 36. The structure of the position holding unit may be changed as long as the lock bar 36 can be held in place.

The vehicle 1 is not limited to a hybrid vehicle and may be an electric vehicle driven by only a motor.

The application of the power plug locking device 23 is limited to the vehicle 1. The power plug locking device 23 may also be applied to other devices and apparatuses.

The present examples and embodiments are to be considered as illustrative and not restrictive, and the invention is not to be limited to the details given herein, but may be modified within the scope and equivalence of the appended claims.

The invention claimed is:

1. A power plug locking device that prevents unauthorized removal of a power plug from an inlet, the power plug locking device comprising:
    a lock member arranged in the inlet, wherein the lock member is engageable with the power plug when the power plug is connected to the inlet;
    an operation unit that moves the lock member to at least one of a lock position and an unlock position;
    a link mechanism that couples the operation unit and the lock member;
    a lock mechanism that transmits an operation force of the operation unit with the link mechanism to the lock member when the operation unit is operated to move the lock member to the lock position or the unlock position;
    a position holding unit that holds the lock member at the lock position or the unlock position;
    a device body that accommodates the lock mechanism;
    a drive unit that drives the position holding unit to release the lock member from the position holding unit, wherein the drive unit is discrete from the device body.

2. The power plug locking device according to claim 1, wherein
    the operation unit is a lock operation unit that locks the power plug to the inlet,
    the lock mechanism transmits an operation force of the lock operation unit with the link mechanism to the lock member when the lock operation unit is operated to move the lock member to the lock position, and
    the position holding unit holds the lock member at the lock position.

3. The power plug locking device according to claim 1, wherein the lock member is pivotal about its axis.

4. The power plug locking device according to claim 1, wherein
the position holding unit includes an engagement member that is directly engaged with the lock member when the operation unit is operated to hold the lock member at the lock position or the unlock position, and
the drive unit separates the engagement member from the lock member to disengage the engagement member from the lock member.

5. The power plug locking device according to claim 1, further comprising an automatic returning unit that automatically returns the lock member, the operation unit, and the link mechanism to an initial state prior to the operation of the operation unit when the lock member is released from the position holding unit.

6. The power plug locking device according to claim 1, further comprising a manual operation unit operated to manually move the link mechanism.

7. The power plug locking device according to claim 4, wherein
the inlet includes a projection,
the power plug includes an operation arm hooked to the projection of the inlet, and
the lock member includes a solid portion, which restricts removal of the operation arm from the projection when the lock member is located at the lock position, and a hollow portion, which provides space permitting removal of the operation member from the projection when the lock member is located at the unlock position.

8. The power plug locking device according to claim 7, wherein when the lock member is located at the lock position, the hollow portion faces the engagement member, and the engagement member is engaged with the hollow portion of the lock member to maintain the lock member in a state held by the position holding unit.

* * * * *